UNITED STATES PATENT OFFICE.

HANS KREUSLER, OF WILMERSDORF, NEAR BERLIN, GERMANY, ASSIGNOR TO SIEMENS & HALSKE A. G., OF BERLIN, GERMANY, A CORPORATION OF GERMANY.

METHOD OF MAKING A PLASTIC MASS FROM COMPOUND OF TUNGSTEN, &c.

956,979.  Specification of Letters Patent.  Patented May 3, 1910.

No Drawing.  Application filed June 22, 1907. Serial No. 380,356.

*To all whom it may concern:*

Be it known that I, HANS KREUSLER, a subject of the German Emperor, residing at Wilmersdorf, near Berlin, Germany, have invented a certain new and useful Improvement in Methods of Making a Plastic Mass from Compounds of Tungsten, &c., of which the following is a specification.

The present invention relates to a method of making a plastic mass from tungsten compounds.

An important object of the invention is to provide a plastic mass which possesses adhesive qualities similar to glue, and which may be easily drawn into long threads or filaments in a manner which will be clear to those skilled in the art of manufacturing filaments for incandescent lamps.

In accordance with my invention dry acid tungstate of ammonium, to which metatungstate of ammonium belongs, is placed in a flask which is substantially exhausted of air by suitable well known means. The substance is then heated in dry condition at a temperature considerably below red heat, for example about 270° C., thereby driving off ammonia. During this heating in a vacuum the mass is in strong agitation. If the temperature rises too high further decomposition would take place and the proper working of the process be interfered with. The heating is continued a length of time dependent upon the quantity of the acid ammonium tungstate until the mass assumes a dull green color, and until no more ammonia is driven off. If for example 100 grams of the acid tungstate of ammonium is employed, this will require about twenty minutes. The dull green color and the cessation of ammonia will indicate unmistakably the sufficiency of the time of heating. When the mass cools the dull green color disappears. The final product, which is thus obtained is slightly soluble in water at ordinary temperature and yields a viscous paste in hot water or after it is boiled for a short time in water, and this paste is of a glassy or horny appearance and colorless or only weakly colored, and transparent and adheres like glue and may be drawn into threads or filaments if too much water has not been employed. The threads or filaments which are obtained in this manner may by suitable treatment be rendered suitable for use as filaments in electric incandescent lamps. Furthermore the viscous mass just described may be employed with particular advantage as an agglutinant for a paste of tungsten oxids in connection with the process described in my co-pending application, Ser. No. 372,371, filed May 7th, 1907, for method of making filaments.

I claim:

1. A method of making a plastic mass from compounds of tungsten consisting in heating dry acid tungstate of ammonium in a vacuum to about 270° C. until ammonia is no longer generated, in allowing the heated mass to cool, and in then placing the same in hot water whereby a viscous paste is obtained.

2. A method of making a plastic mass from compounds of tungsten consisting in heating dry acid tungstate of ammonium in vacuum to about 270° C. until ammonia is no longer generated, in allowing the heated mass to cool, and in then boiling the same in water, whereby a viscous mass is obtained.

In testimony whereof, I have signed my name to this specification in the presence of the two subscribing witnesses.

HANS KREUSLER.

Witnesses:
HENRY HASPER,
WOLDEMAR HAUPT.